United States Patent [19]

Blanding et al.

[11] 4,261,706
[45] * Apr. 14, 1981

[54] METHOD OF MANUFACTURING CONNECTED PARTICLES OF UNIFORM SIZE AND SHAPE WITH A BACKING

[75] Inventors: Wendell S. Blanding, Painted Post; Jack A. Brothers, Corning, both of N.Y.

[73] Assignee: Corning Glass Works, Corning, N.Y.

[ * ] Notice: The portion of the term of this patent subsequent to Oct. 14, 1996, has been disclaimed.

[21] Appl. No.: 577,473

[22] Filed: May 14, 1975

Related U.S. Application Data

[62] Division of Ser. No. 469,449, May 13, 1974, abandoned, which is a division of Ser. No. 253,186, May 15, 1972, Pat. No. 3,859,407.

[51] Int. Cl.³ .................................................. B24D 11/02
[52] U.S. Cl. ........................................ 51/295; 51/308; 264/62
[58] Field of Search .................. 264/62, 141, 177, 67, 264/160, 60; 51/295, 309, 308

[56] References Cited

U.S. PATENT DOCUMENTS

| | | | |
|---|---|---|---|
| 2,194,472 | 3/1940 | Jackson | 51/298 |
| 2,455,509 | 12/1948 | Luaces | 264/141 |
| 2,464,746 | 3/1949 | Gering | 264/141 |
| 2,601,200 | 6/1952 | Amos et al. | 264/140 |
| 2,887,725 | 5/1959 | Vickers et al. | 264/141 |
| 3,202,746 | 8/1965 | Day et al. | 264/141 |
| 3,401,490 | 9/1968 | Mora | 51/295 |
| 3,478,138 | 11/1969 | Friesner | 264/145 |
| 3,670,467 | 6/1972 | Walker | 51/298 |
| 3,859,407 | 1/1975 | Blanding et al. | 51/295 |

FOREIGN PATENT DOCUMENTS

882875  11/1961  United Kingdom ............... 264/141

Primary Examiner—Donald J. Arnold
Attorney, Agent, or Firm—Burton R. Turner

[57] ABSTRACT

Plastically formable material, which may be formed under pressure into desired shapes, is fed while in a fluid or plastically formable condition to a pair of cooperating surfaces which are relatively movable into compressive relationship with material disposed therebetween. The face of at least one of such surfaces is patterned with a plurality of juxtapositioned geometrical impressions of desired size and shape so as to form a ribbon or sheet of uniformly sized and shaped particles from the plastically formable material supplied to the cooperating surfaces. The uniform particles are initially joined together by thin web or edge portions which maintain the continuity of the newly formed particles within a sheet form. However, after the ribbon of newly formed particles has become sufficiently rigid, such as through the cooling of a molten thermoplastic material or the drying or firing of a green ceramic material from which such ribbon may be formed, the ribbon may then be flexed in various directions to separate the particles along the edge or web portions, thus providing a plurality of individual particles having substantially uniform size and shape.

4 Claims, 17 Drawing Figures

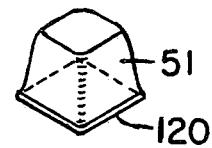
Fig. 5a  Fig. 5b
Fig. 6a  Fig. 6b
Fig. 7a  Fig. 7b
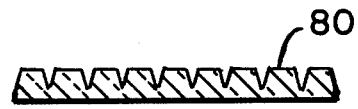
Fig. 8a  Fig. 8b
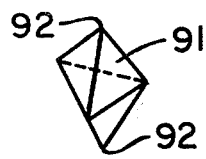
Fig. 9a  Fig. 9b
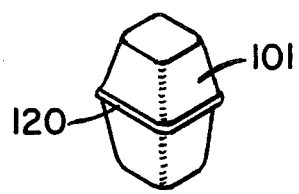
Fig. 10a  Fig. 10b

METHOD OF MANUFACTURING CONNECTED PARTICLES OF UNIFORM SIZE AND SHAPE WITH A BACKING

This is a division, of application Ser. No. 469,449, filed May 13, 1974 now abandoned, while in turn was a divisional application of Ser. No. 253,186 filed May 15, 1972 now U.S. Pat. No. 3,859,407.

BACKGROUND OF THE INVENTION

The present invention resides in the field of discrete particle manufacture, and particularly is concerned with the problem of repeatably forming particles having virtually identical size and shape.

The granules or particles manufactured by the present invention have utility in numerous fields including gripping elements for road surfaces and abrasive grains for use in bonded abrasive articles such as grinding wheels and snagging wheels, and coated abrasive articles such as abrasive papers and the like. One of the problems that has plagued the industry in the manufacture of discrete particles for use as abrasive grains has been the inability to continually reproduce grains of the same size and shape. That is, it has been customary in the past to manufacture abrasive grains by crushing abrasive type material into granular form. However, in the case of heavy duty abrasive grits, usually less than 50% of the total material is recovered in a usable size range, with the majority of the material being crushed into useless fines. Further, that material which is usable must then be classified into standard grain sizes. However, since the crushing process cannot be accurately controlled, the shape of the grains even within a particular classification will vary materially, thus producing grains with dissimilar cutting rates and variable useful lives, thereby resulting in less than optimal efficiencies. The shape of crushed abrasive particles can be improved somewhat by mulling, however such process is not only costly but results in even lower recoveries.

U.S. Pat. No. 3,481,723 illustrates a method of producing shaped abrasive grains by extruding predetermined lengths of a green ceramic mixture which is then sintered to form hard abrasive grains. However, due to the extrusion forming thereof, the shape of such grains is severely limited to a pre-shaped cylindrical or prismatic configuration, with the only variable cross-section lying in a plane perpendicular to the axis of extrusion. Therefore, although the extruded sintered abrasive grains were an improvement over the randomly crushed grains, they have not been entirely satisfactory since variable 3-dimensional geometric solids are not obtainable and the manufacturing process is not particularly economical.

The present invention not only obviates the problem of repeatably producing uniform particles of virtually identical size and shape, but also provides a simplified continuous or repeatable process for rapidly and economically producing such particles in mass production.

SUMMARY OF THE INVENTION

The present invention sets forth a completely new concept in the manufacture of particulate matter having uniform size and shape from a flowable plastically formable material. In its simplest form, the present invention includes the flowing of plastically formable material to a pair of cooperating forming members having one or more of the cooperating surfaces thereof engraved or contoured with recesses or patterns of desired size and shape. Accordingly, the cooperating members produce a plurality of uniform particles of substantially identical size and shape which are joined together along adjacent connecting edge portions by means of a thin web portion.

Any flowable plastically formable material may be supplied to the cooperating members including thermoplastic materials such as basalts and molten vitreous materials, as well as thixotropic and thermosetting materials such as ceramic batches, wherein all such materials have the property of being able to flow and be plastically formed during the application of forming pressure, while also being able to become sufficiently rigid immediately thereafter so as to maintain structural integrity. That is, when the particles are formed of a thermoplastic material, the ribbon of newly formed particles is cooled and solidified immediately thereafter in order to provide sufficient rigidity so as to maintain the structural integrity of the newly formed particles, whereas when such ribbon is formed of a ceramic batch, it may be dried or fired in order to obtain the necessary rigidity.

Depending upon the particular application to which the particles are to be utilized, the cooperating forming members may be either a pair of cooperating forming rollers or a mold and plunger set. That is, the particles may either be roll-formed or press-formed depending upon the particular forming device utilized, however, in both instances the forming of the plastically formable material is accomplished through a pressing force exerted between a pair of forming members having one or more cooperating surfaces thereof contoured with patterns for forming the particles of desired size and shape. Roll-forming has the advantage of providing a continuous forming process, whereas press-forming by means of a mold and plunger has the advantage of greater flexibility in providing lower volume speciality items.

In view of the fact that the basic forming operation of the present invention, which includes the exertion of pressure by two cooperating surfaces on plastically formable material to produce particles of a given size and shape, may be accomplished by either roll-forming or linear press-forming, the invention will be described in particular only with respect to roll-forming, as the similarities between the two processes will be readily appreciated by those skilled in the art. Depending upon the surface patterning and the orientation of the cooperating members, it is possible to form particles which extend solely from one surface of the ribbon with the opposite surface being flat, such as may be utilized with coated abrasive sheets; or the particles may project outwardly in staggered relation from opposite sides of the resulting sheet; or finally, the recesses in the opposed faces may be mated or aligned and synchronized so that the resulting particles have opposed apexes projecting equally distant on opposite sides of the ribbon from a thin web-like plane bisecting the axis between such apexes. In all cases, however, since the recesses or impressions formed in the cooperating surfaces are of a desired uniform size and shape, the resulting particles formed thereby are also virtually identical in both size and configuration, thus providing a theoretical 100% selection.

The newly formed particles may be conveniently conveyed or transported in ribbon form for further processing as may be desired, and the plurality of particles making up the ribbon may, after becoming sufficiently rigidified to prevent deformation, then be separated or liberated therefrom in individual form by various means such as a pair of soft, off-set rolls. The rolls cause the substantially rigid sheet or ribbon of particles to flex in various directions out of the plane of the sheet, thus liberating or separating the particles along the edge or web portions from the sheet as individual grains of uniform size and shape which may then be conveniently collected for bulk packaging. It will be apparent, however, that the individual particles may be liberated from the ribbon either before or after any additional treatment, such as metallizing, is undertaken.

It thus has been an object of the present invention to obviate the uneconomical and virtually uncontrollable prior art processes of forming particulate matter usable as abrasive grains or highway traction particles, by providing an improved process of forming, such as by continuously rolling, a plurality of interconnected particles of like size and shape in ribbon form from plastically formable material such as green ceramic or molten vitreous material, with the ribbon of connected particles, after rigidification, being subsequently separable into uniform individual particles.

BRIEF DESCRIPTION OF THE DRAWINGS

FIGS. 5a, 6a, 7a, 8a, 9a and 10a illustrate various shapes of particles in ribbon form which may be produced by the present invention, whereas corresponding FIGS. 5b, 6b, 7b, 8b, 9b and 10b illustrate the shape of the individual particles after they have been separated or liberated from their corresponding ribbon.

DESCRIPTION OF THE PREFERRED EMBODIMENTS

Figure 1A:
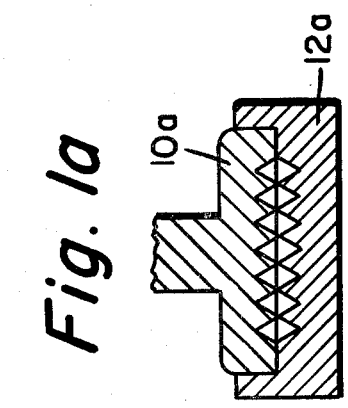
FIG. 1a is a sectional view illustrating a further embodiment.
Figure 1:
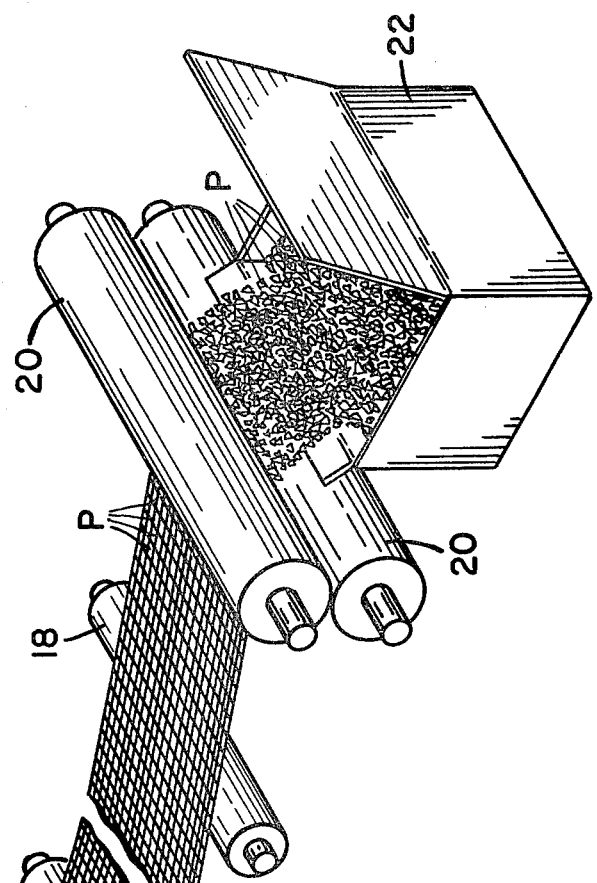
FIG. 1 is a somewhat schematic perspective view illustrating the process and apparatus of the present invention for continuously forming particles of substantially identical size and shape.
Figure 1:
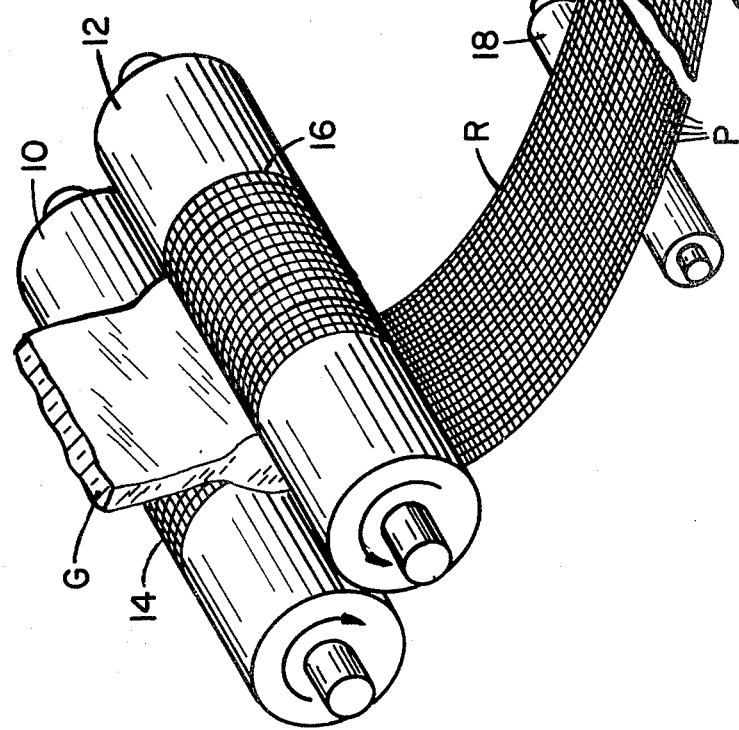

Referring now to the schematic illustration of FIG. 1, a pair of cooperating forming rollers 10, 12 which may be water cooled if desired, and having engraved or recessed patterned surfaces 14, 16, roll-forms a flow of plastically formable material G, such as green ceramic batch or molten glass or basalts, into a continuous ribbon R of interconnected particles P. The rollers are rotatable about parallel longitudinal axes toward one another as shown by the arrows, so that the flowable material G supplied thereto is roll-formed as it passes through the bite. As shown, the ribbon may be transferred along conveyor rollers 18 to a pair of soft, off-set flexing rolls 20 which distort and flex the now rigidified ribbon R in various directions out of its natural plane and thereby liberate the connected particles P from the ribbon so they may fall as separate individual particles P and be collected in a container 22. The ribbon R is shown as being discontinuous between conveyor rollers 18 to indicate that additional processing such as solidifying, drying, firing and metallizing may be imparted to the ribbon as desired prior to the liberating or separating of the various particles therefrom into their inidividual state. For example, the newly formed ribbon R, if of a siliceous vitreous material, may be subjected to a metallizing treatment such as by contacting it with molten aluminum as described in U.S. Pat. No. 2,702,750, so as to form cermet particles which are especially suited for heavy-duty abrasive grain application.

The recessed or engraved patterned surface may be formed in either or both of the cooperating rollers 10, 12 as desired. When the recessed or engraved pattern is formed in the surface of only one roller and the opposed surface of the other cooperating roller is smooth, a plurality of particles are formed within the resulting ribbon having a flat or planar back surface, with the particles projecting outwardly only from one side of such ribbon and being joined together along adjacent edge portions thereof. When such a ribbon is formed having a flat or planar back surface, it may be desirable, after appropriate treatment, to utilize the particles in ribbon form in a coated abrasive article by applying a backing thereto, without requiring the separating or liberating of the individual particles from the ribbon.

As shown in the schematic illustration of FIG. 1, both of the operating surfaces 14, 16 of the cooperating forming rolls 10, 12 may be provided with desired impressions to provide a specific pattern on both sides of a ribbon of material which passes through the bite of such rollers. The impressions made in the roller surfaces are uniform with respect to one another and may be of any desired size and shape such as tetrahedra, cubes, octahedra and other geometric shapes. As previously pointed out, the particles formed by the recessed surfaces are initially joined together in ribbon form, either along common edge portions or by means of a narrow thin web of vitreous material, with the exact manner in which the particles are joined being dependent upon the shape being produced.

Figure 2:
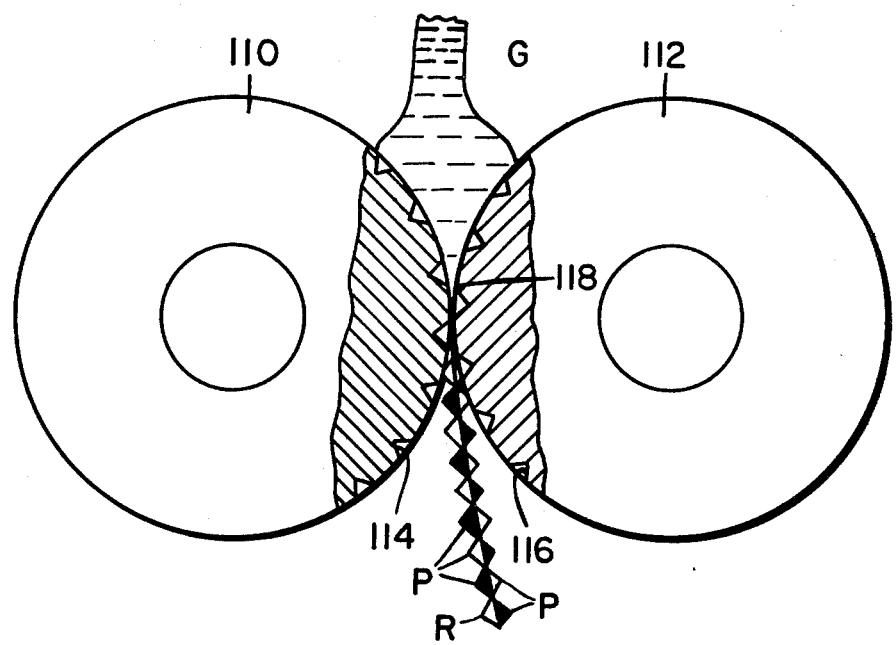
FIG. 2 is an elevational view in section through the bite of a pair of cooperating rollers.

When both of the cooperating rollers are provided with engraved surfaces, the recesses or impressions in each such surface may be staggered or off-set as illustrated in the embodiment shown in FIG. 2, or the impressions on the surfaces may be synchronized by the speed of rotation of the rollers so that the patterns on opposing rollers are matched when in contact with the plastically formable material at the bite of the rollers. Similarly, as illustrated in FIG. 1a, the forming members shown as plunger 10a and mold 12a are provided with cooperating surfaces having mating or matched impressions so that the patterns cooperate to form a ribbon of particles within the mold which extend outwardly from opposite sides of the ribbon per se. Accordingly, the resultant particles may be symmetrical about a plane perpendicularly bisecting an axis passing through a pair of opposed apexes formed by each such particle. Whether the opposed patterns on the forming members are mated in synchronized relation or not, adjacent particles may be connected to one another in ribbon form either by connecting edge portions or by a small connecting web portion, however, in either case the particles may be liberated from the ribbon form to their separate state by means of a pair of off-set flexing rolls or the like which permit the connected particles to break apart from the ribbon while maintaining their initially formed individual integrity. That is, since the flexing rolls do not affect the size or shape of the individual particles per se, but merely separates one from another, it is possible to continuously and repeatably produce particles of a given size and shape with about 95-100% selection, since there is no crushing or deleterious deformation of the particles as was occasioned in the prior art processes.

Although virtually any size of particle above 0.01 inches may be formed with the present invention, for the purpose of manufacturing abrasive grains we prefer to form articles having an altitude, or apex to apex distance, of between about 0.028 inches and 0.157 inches. It will be apparent that the upper size limit of particle manufacture will be limited only by the pressing capacity of the cooperating surfaces, whereas the lower limit of about 0.01 inches is dictated by the minimum thickness of the resulting web which would be sufficient to maintain the integrity of the ribbon. As previously mentioned, the individual geometric shapes of the particular particles may be liberated from the rigidified ribbon or sheet by providing a sufficient deflection of the ribbon to cause a brittle fracture along the thinnest portions thereof, such as the common edges of the particle shapes or the thin web of vitreous material between such shapes. The liberated particles of geometric shapes are then collected and further processed as dictated by their end use.

Figure 3:
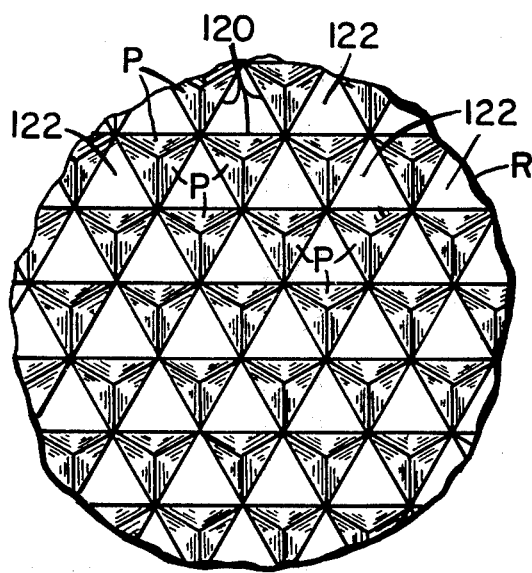
FIG. 3 is a greatly enlarged fragmental view in plan of a plurality of particles in ribbon form produced by the rollers of FIG. 2.
Figure 4:
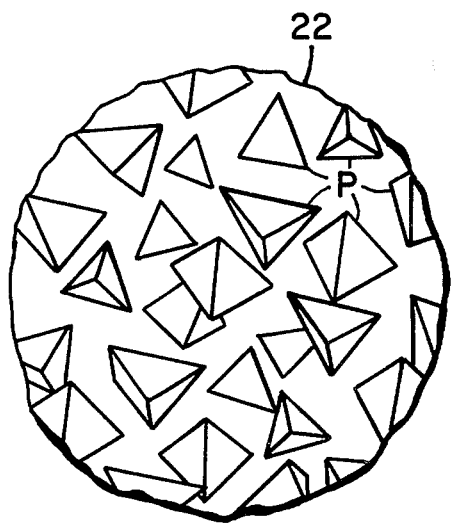
FIG. 4 is a greatly enlarged fragmental view of a plurality of particles after they been liberated or separated from the ribbon of particles shown in FIG. 3.

Referring now to the embodiment shown in FIG. 2, the forming rollers 110, 112 are provided with recessed or engraved pattern surfaces 114, 116 which are staggered or off-set with one another at the bite 118 of the rollers. Each of the patterned surfaces 114, 116 is provided with a plurality of pyramidal or tetrahedral shaped recesses of equal size and shape. Accordingly, the plastically formable material G, such as molten glass, which is fed to the forming rollers 110, 112, is formed into a ribbon R having a plurality of off-set tetrahedral or pyramidal particles P extending outwardly from both sides thereof. As shown in FIG. 3, the pyramidal particles P extending outwardly from one side of the ribbon R are bound together along connecting edges 120 of the flats or bottoms 122 of pyramidal particles P extending outwardly from the opposite side of the ribbon. As shown in FIG. 4, the individual particles P, after being liberated from the ribbon R and falling into the container 22, are all of the same size and shape as originally formed by the cavities or recesses of the forming rollers.

Referring now to FIGS. 5a through 10b which illustrate some of the various forms of ribbons and particles which may be produced by the present invention, it will be noted that the ribbons shown in FIGS. 5a, 6a, 7a and 8a all have a flat or planar back or bottom surface, such as would be produced when only one roll or mold surface is provided with a recessed or engraved pattern. The ribbon 50 of FIG. 5a is formed of a plurality of particles 51, shown in FIG. 5b, having the appearance of a slightly rounded cube or frustum. The web or connecting edge portion of the particles 51 is shown at 120. It should be further noted, that the ribbon 100 shown in FIG. 10a and the particle 101 of FIG. 10b formed thereform, may be produced by synchronizing two forming rollers having the same surface pattern which forms ribbon 50 of FIG. 5a. That is, ribbon 100 produces particles 101, each of which has a pair of symmetrical shapes, similar to particle 51, extending outwardly on opposite sides of the ribbon from a plane perpendicularly bisecting an axis extending between opposed apexes of the particle 101. The connecting edge or web portions which lie in the bisecting plane are shown at 120.

Ribbon 60, of FIG. 6a produces a plurality of pyramids 61 having a square base and four triangular sides converging at an apex. If a second roller, having a patterned recess similar to that on the first roller forming particle 61, were synchronized with such first roller, a particle projecting outwardly from opposite sides of the ribbon and having an octrahedral configuration would be formed. FIG. 7a illustrates a ribbon 70 for forming a multi-surfaced particle 71 having numerous edges which are useful when the particle is used as a cutting grain. FIG. 8a illustrates a ribbon 80 which produces particles 81 having an eight-sided configuration. As previously mentioned, ribbons 50, 60, 70 and 80, which are provided with a flat or planar back surface, may be utilized in the as-produced ribbon form, after being suitably treated, by providing the same with backing sheets so as to form coated abrasive articles.

FIG. 9a illustrates a ribbon 90 for producing particles 91 having a hexahedral configuration. Such configuration would be formed by rollers 110, 112, when the speed thereof is adjusted so that the impressed or recessed portions 114, 116 are synchronized and cooperate with one another as they pass through the bite 118 of the rollers. Also the mating surfaces of plunger 10a and mold 12a could produce the hexahedral particle configuration of FIGS. 9a and 9b. Accordingly, particle 91 is characterized by a pair of opposed pyramids projecting outwardly from opposite sides of the ribbon 90 such that the connecting web 120 or plane of the ribbon 90 bisects an axis extending between opposed apexes 92 of the hexahedral configuration of the shaped particle 91.

The fact that the present invention permits a highly controlled geometric shape of the particle is of particular significane when such particle is used as an abrasive grain. That is, improved abrasive performance can be achieved by controlling the shape to maximize grain sharpness and grain toughness. Also, the shape can be designed to supply anchors for the resin or other bond utilized to hold the grains on a grinding or snagging wheel and thereby increase the strength and life of such a wheel. Further, the shape may be optimized to increase the particle packing of the grains and thus increase the volume of grains per wheel. Finally, the present process allows for very accurate control of the particle size distribution of the grains produced, and therefor permits the manufacture of highly reproducible abrasive products from such grains.

From the foregoing it will be appreciated that virtually any desired geometric shape of particle may be continuously or intermittantly reproduced either in a single patterned surface or in cooperating patterned surfaces, and such particles may be formed of virtually any desired plastically formable material which becomes rigid and sets-up after forming, such as by firing or cooling. Preferably, the particles are formed from green ceramic material or thermoplastic materials, such as basalts or siliceous glass compositions, with the latter providing a basis for transforming the particles into cermets by known metallizing processes. Such metallizing processes are described in U.S. Pat. No. 2,702,750, however, we prefer to subject the newly formed siliceous particles into contact with molten aluminum at about 700° C. for about 2½ to 10 hours, for No. 20 to No. 6 grit sizes, respectively. Although it will be appreciated that operating parameters may vary over wide limits depending upon the material being produced, the following specific example is given merely for purposes of illustration.

A 17.6% MgO-29.7% Al$_2$O$_3$-9.1% B$_2$O$_3$-43.6% SiO$_2$ glass was melted at 1650° C. and poured at about 1400° C. between a pair of cooperating water cooled stainless steel forming rolls. Each of the rolls was provided with an engraved or recessed patterned surface in the form of one half of an octrahedral impression, and the rolls were then synchronized so that the patterns on opposing rolls were matched when in contact with the molten glass at the bite thereof. The rolls were rotated at approximately 28 RPM and spaced about 0.005 inches apart. The formed glass ribbon was pulled vertically downwardly from the rolls and contained small glass octrahedra measuring 0.069 inches from point to point along an axis extending between opposed apexes thereof. The octrahedra were separated by a thin web of glass which laid within a plane bisecting the axis extending between the apexes. On cooling, the ribbon was easily broken to liberate the small glass octrahedra which were then collected for further treatment.

Although we have disclosed the now preferred embodiments of our invention, it will be apparent to those skilled in the art that various changes and modifications may be made thereto without departing from the spirit and scope thereof as defined in the appended claims.

We claim:

1. A method of continuously forming joined-together particles of uniform size and shape from flowable thermoplastic vitreous or thermosetting ceramic material which comprises, providing a pair of cooperating forming rollers, providing a patterned surface having a plurality of individual uniform recesses of desired size and shape across and about an operating surface of at least one of said cooperating rollers, supplying a flow of said flowable material to the bite of said cooperating rollers, roll-forming between said single pair of cooperating forming rollers a ribbon of particles of uniform size and shape positioned across and along said ribbon and with said uniform particles being connected together along adjacent edge portions thereof, and applying a backing to said ribbon of connected particles.

2. A method of forming a coated abrasive article from a ribbon of abrasive particles of uniform size and shape formed from flowable plastically formable thermoplastic vitreous or thermosetting ceramic batch material which comprises, providing a pair of cooperating forming members, providing a patterned surface having a plurality of uniform particle-forming recesses of desired size and shape in an operating surface of only one of said forming members, providing a smooth operating surface on the other of said forming members, delivering a supply of said plastically formable vitreous or ceramic batch material to at least one of said forming members, urging portions of said forming members toward one another so as to form the plastically formable material therebetween into a ribbon of particles of uniform size and shape projecting outwardly only from one surface of said ribbon with the opposite surface thereof being continuous and substantially planar, and said uniform particles being connected together along adjacent edge portions extending both across and along said ribbon, and applying a backing to said substantially planar continuous surface of said ribbon of particles to form a coated abrasive article having connected particles of uniform size and shape.

3. A method of forming joined-together particles of uniform size and shape as defined in claim 1 including the steps of providing a patterned surface having a plurality of uniform recesses of desired size and shape in the operating surface of only one of said cooperating rollers, providing a smooth surface on the opposed cooperating roller, roll-forming a ribbon of particles of uniform size and shape projecting only from one surface of said ribbon with the opposite surface being substantially planar, and applying said backing to said substantially planar surface to form a coated abrasive article having joined-together particles of uniform size and shape.

4. A method of forming a coated abrasive article from a ribbon of abrasive particles of uniform size and shape as defined in claim 2 wherein said forming members, being in the configuration of a single pair of cooperating rollers, are rotated in unison to roll-form the plastically formable material into a ribbon of particles of uniform size and shape.

* * * * *